S. J. Seely,
Canal-Lock Gate,

Nº 28,201. Patented May 8, 1860.

WITNESSES:
S. W. Morton
T. S. Gillett

INVENTOR:
Saml. J. Seely

UNITED STATES PATENT OFFICE.

SAMUEL J. SEELY, OF ALBANY, NEW YORK.

GATE FOR CANAL-LOCKS.

Specification of Letters Patent No. 28,201, dated May 8, 1860.

*To all whom it may concern:*

Be it known that I, SAMUEL J. SEELY, of the city and county of Albany and State of New York, have invented certain new and useful Improvements in Gates for Canal-Locks; and I do hereby declare that the following is a full and exact description of the same, reference being had to the accompanying drawings, and to the letters of reference marked thereon, in which—

Figure 2:
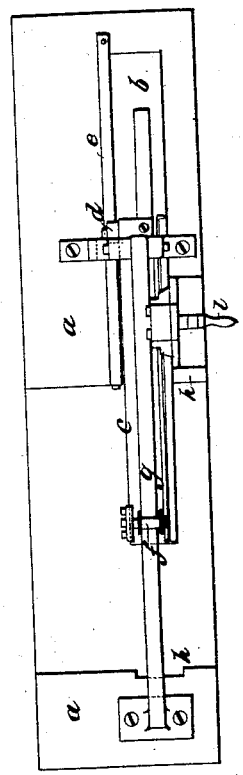
Figure 1:
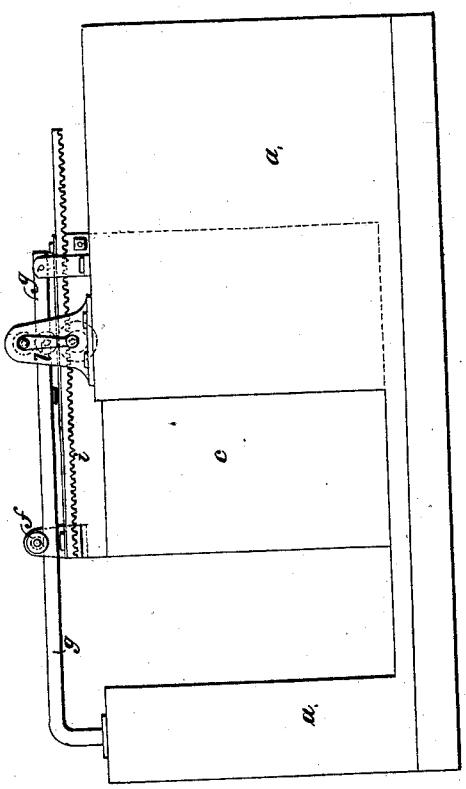
Figure 3:
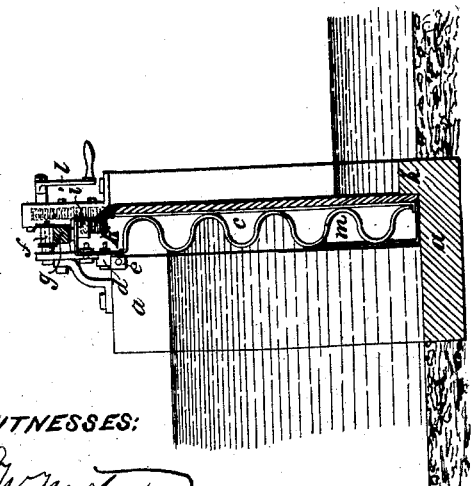

Figure 1 is a plan view, Fig. 2, a front elevation, and Fig. 3, a transverse vertical section.

My invention consists in constructing the sliding gate of corrugated metal to give to it increased strength without unduly adding to its weight, and in making a portion or the whole of the gate into air-chambers in order that its weight may be lessened by its buoyancy, so that it can be moved back and forth, to open and close it, with little effort on the part of its operator.

$a$ $a'$ are the ends of the side walls, at the lower end of the lock; in the former of which is constructed the chamber $b$ of sufficient length, width and depth to receive the gate $c$ when the gate is opened to allow a boat to enter or leave the lock; and in the latter a rabetted recess H to receive the end of the gate to hold it securely when the gate is closed.

$c$ is the sliding gate, made of corrugated plate iron, and of a depth equal to that of the lock, and of a length sufficient to close securely the front of the lock to retain in it the water to the height of the level above the lock.

The front and back of the gate are covered with planking or with metal plates resting upon and against the points of the corrugations of it, for the purposes of protecting the gate from injury by boats coming in contact with it; to make the gate fit tightly to the front side of the chambers $b$ and $h$ to prevent undue leakage of water past the gate when the lock is filled; and to form an air-chamber or a series of air-chambers to render the gate buoyant that it may be operated with the least possible effort on the part of its operator.

The gate may be supported—as shown in the drawings—at one end by the roller $f$ running upon the top of the crossbar $g$, and at the other, by the roller $d$ running upon the bar $e$ on the edge of the chamber $b$, or by rollers placed on its bottom edge and running in or upon suitable ways laid at the bottom of the lock. It is opened and closed by turning the handle $l$ to revolve the pinion $k$ which gears into the toothed rack $i$ attached to its top edge. The metallic portion of the body of the gate is surrounded on its edges by a strong timber frame, which gives solidity and stiffness to the gate, and fits against the ends of the corrugations to form and complete the air-chambers before named.

If the gate is suspended on rollers at its top edge, the cross-bar $g$ should be of such height above the lock that boats may pass beneath it to enter or leave the lock, but if it is supported by, and moves upon rollers attached to its bottom edge the cross-bar is dispensed with.

The gate herein described as applicable to the lower end of the lock, is equally well adapted to the upper end of the same, with proper modifications, and may be applied in that position with all the advantages set forth for the lower gate.

The advantages of my invention will be apparent to every person familiar with canal navigation, as it lessens the length of the lock required to fit a given length of boat, or allows boats of greater length and tonnage to be used with a given length of lock. It can be operated with ease by one person where the swing gates at present used require at least two persons to operate them. It expedites the locking of boats through the lock, as it can be opened or closed in much less time than the swing gates, as it does not displace the water by its movement backward or forward as the swing gates do by their movement around and upon their centers; and it can be constructed at less expense, and is less liable to become disordered by use than the swing gates.

What I claim as my invention and desire to secure by Letters Patent is—

1. The use of corrugated metal plates to form the body of the lock-gate, for the purpose of giving to the gate increased strength without unduly increasing its weight, as herein described.

2. Forming of the corrugated spaces of the lock-gate air-chambers as set forth to give buoyancy to the gate to allow it to be operated with a small amount of power as described.

SAML. J. SEELY.

Witnesses:
FRANCIS S. LOW,
WILLIAM H. LOW.